Jan. 6, 1970     S. G. MILLER ET AL     3,487,663
SHELL-LESS LAUNDRY WASHER CONSTRUCTION
Filed May 8, 1968     10 Sheets-Sheet 1
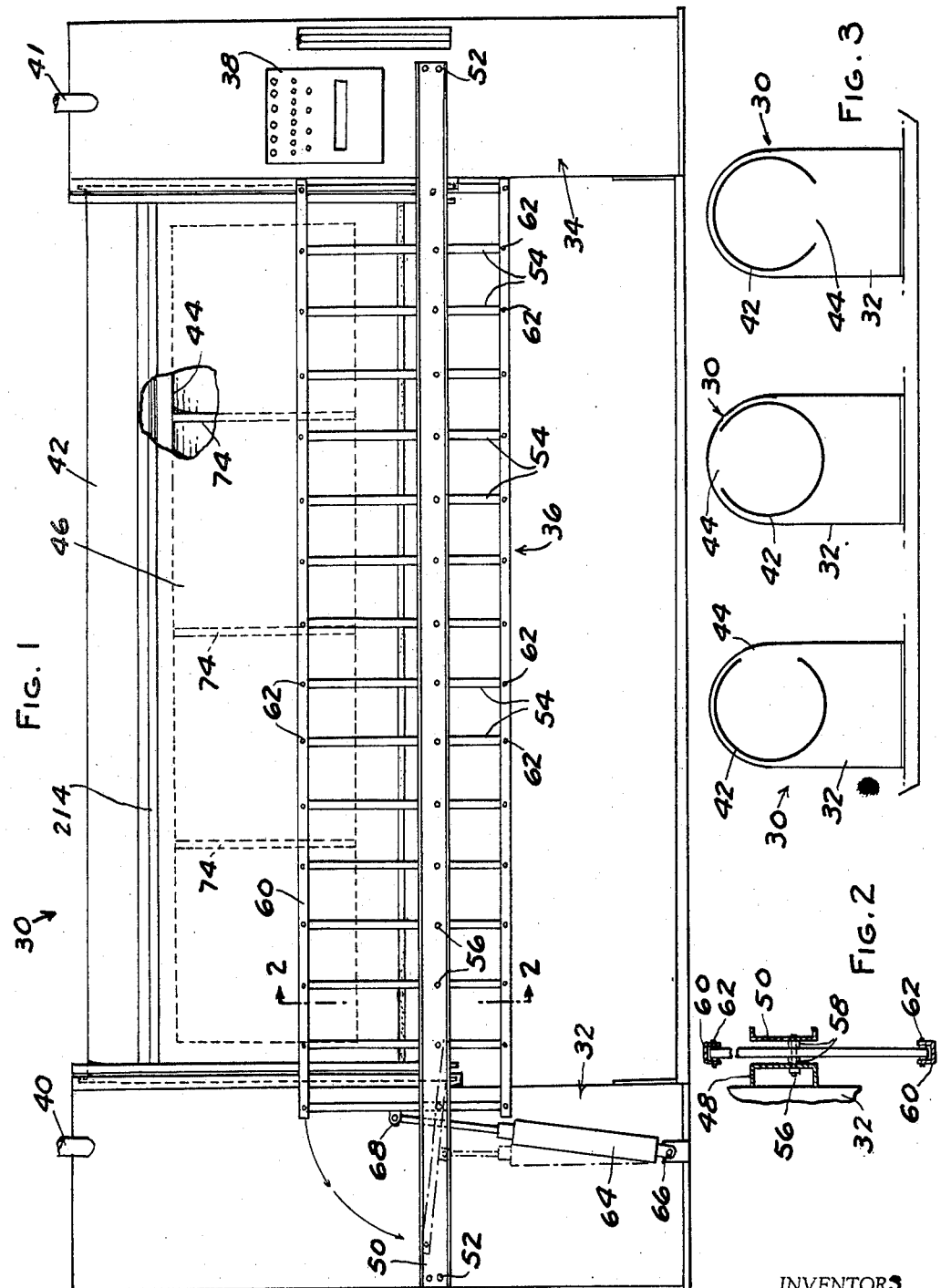
INVENTORS
SOLOMON G. MILLER
DAVID G. MILSON
BY
*Barnes, Kisselle, Raisch & Choate*
ATTORNEYS

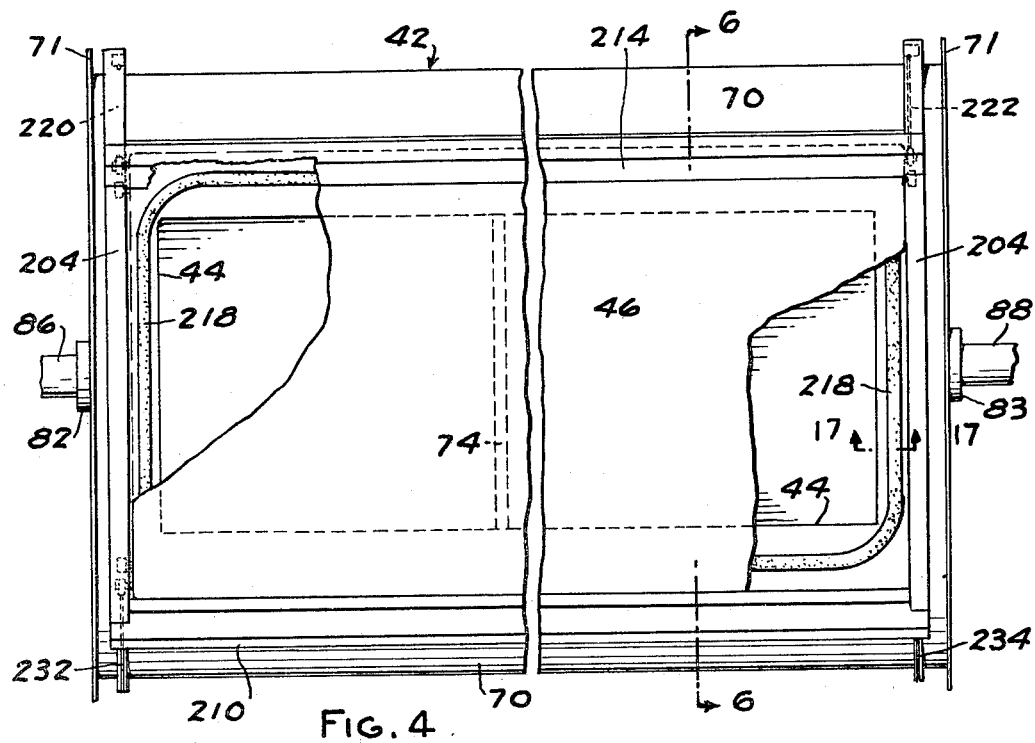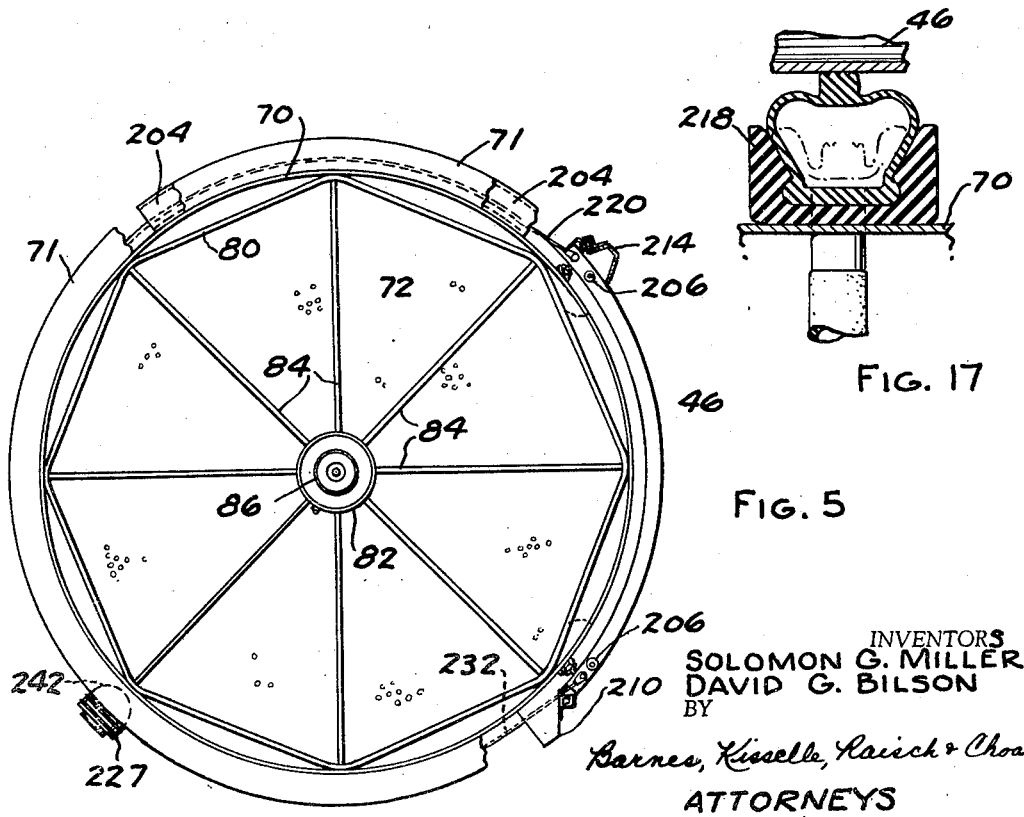

INVENTORS
SOLOMON G. MILLER
DAVID G. BILSON
BY
Barnes, Kisselle, Raisch & Choate
ATTORNEYS

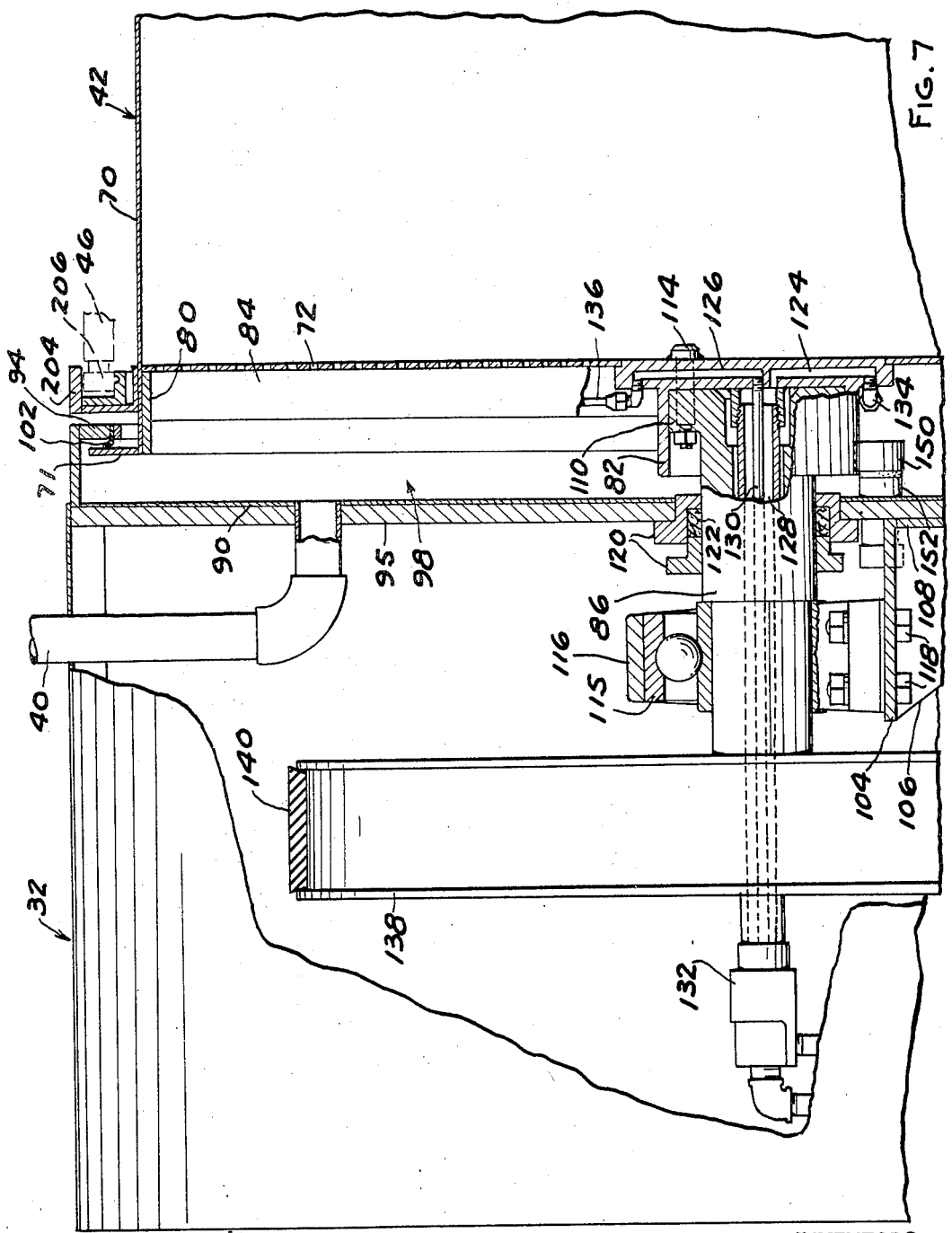

Jan. 6, 1970  S. G. MILLER ET AL  3,487,663
SHELL-LESS LAUNDRY WASHER CONSTRUCTION
Filed May 8, 1968  10 Sheets-Sheet 8

INVENTORS
SOLOMON G. MILLER
DAVID G. BILSON
BY
Barnes, Kisselle, Raisch & Choate
ATTORNEYS

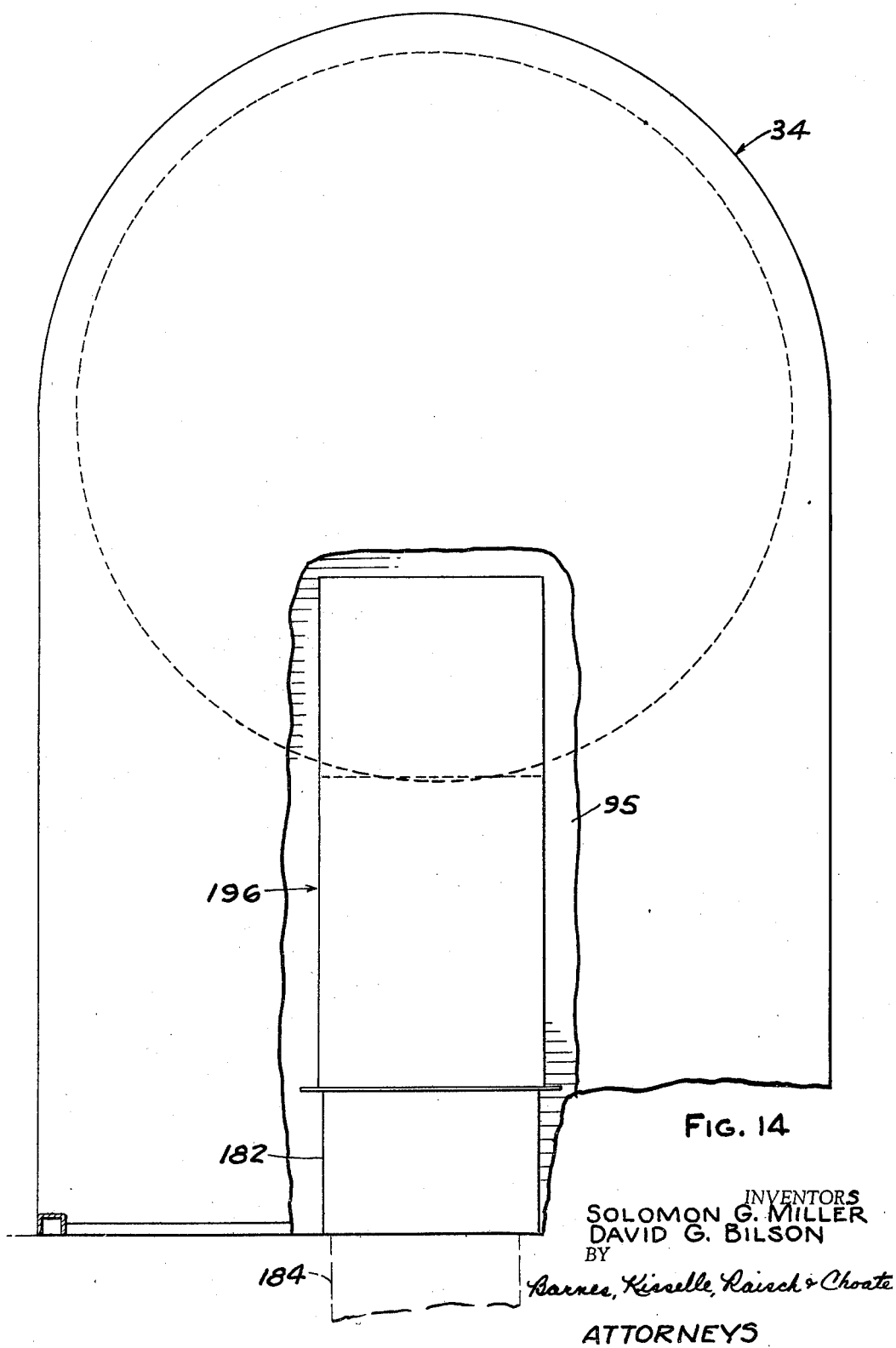

INVENTORS
SOLOMON G. MILLER
DAVID G. BILSON
BY
Barnes, Kisselle, Raisch & Choate
ATTORNEYS United States Patent Office 3,487,663
Patented Jan. 6, 1970

3,487,663
SHELL-LESS LAUNDRY WASHER
CONSTRUCTION
Solomon G. Miller, Birmingham, and David G. Bilson, Detroit, Mich., assignors to Miller Laundry Machinery Company, Detroit, Mich., a corporation of Michigan
Filed May 8, 1968, Ser. No. 727,544
Int. Cl. D06f 21/00, 23/00, 25/00
U.S. Cl. 68—139                                    14 Claims

ABSTRACT OF THE DISCLOSURE

A shell-less washer with a rotatable drum mounted on a fixed base structure having an opening in its periphery and perforated end walls with fixed chambers adjacent to the perforated end walls. The drum is mounted for rotation about its longitudinal axis on a pair of stub shafts journaled on the base and removably connected to hubs centrally located on the drum. Cams underlie the hubs and are connected to the base so that they can be rotated into contact with the hubs to support the drum while the stub shafts are removed. Large liquid inlet and outlet conduits are connected to end walls of the fixed chamber for injecting liquids into and removing them from the drum. A door is connected to a trackway about the outer periphery of the barrel and can be positioned in the trackway to overlie the opening in the drum. An expandable seal is interposed between the drum and the door to provide a watertight seal and to urge the door into firm contact with bumper plates mounted on the drum.

---

This invention relates to improvements in laundry washing machines and more particularly to an improved shell-less laundry washer.

In general, a shell-less washing machine is one in which there is no outer casing or shell that surrounds the drum that holds articles to be washed. Articles to be washed are placed in the drum through openings which are sealed by doors so that the drum is watertight. Water and detergents are injected into the drum and it is rotated to tumble or agitate the articles to be washed. The wash water is then removed and rinse water is injected into the rotating drum to rinse the washed articles. In a shell-less washer the drum must hold both the articles to be washed and the water and detergent or other liquid solutions in which the articles are tumbled or agitated. Therefore, it is necessary to provide liquid inlets and outlets to the rotatable drum and to cover and seal the opening in the drum through which the articles are inserted. In many shell-less washers there are a plurality of doors each of which has a locking mechanism which must be manually manipulated and the seals between the drum and the doors are sometimes inadequate and allow liquid to leak from the rotating drum when the washer is operated.

A principal object of this invention is to provide an improved means of injecting and removing liquids from the drum of a shell-less washer.

Another object of this invention is to provide an improved door seal and lock mechanism.

Another object of this invention is to provide an automatic mechanism for operating the door on the drum of a shell-less washer.

Another object of this invention is to provide a single door which simultaneously covers or uncovers the opening for each compartment of the drum of a shell-less washer and hence is of economical construction.

Another object of this invention is to provide an improved means of selectively supporting the drum of a shell-less washer to facilitate service and maintenance of the washer.

Other objects and features of this invention will be apparent from the following description which discloses the manner and process of making, using and carrying out this invention in the best mode contemplated by the inventors.

Drawings accompany this disclosure and the various views thereof may be described as:

FIG. 1, is a front elevational view of a shell-less washer of the present invention.

FIG. 2, is a sectional view of the safety gate on line 2—2 of FIG. 1.

FIG. 3, a diagrammatic view of loading and unloading positions of the drum of the washer.

FIG. 4, a fragmentary view of the drum with sections of the door broken away.

FIG. 5, an end view of the drum with sections broken away.

Figure 6:
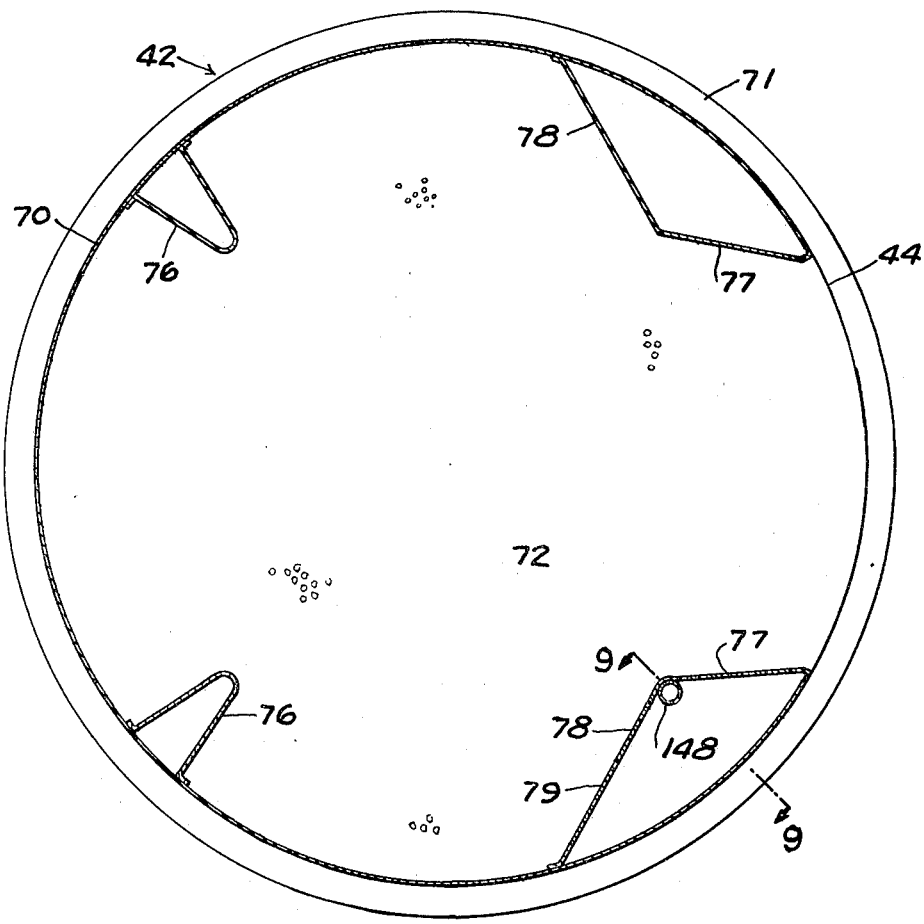

FIG. 6, a sectional view on line 6—6 of FIG. 4 with the door track and door removed.

FIG. 7, a fragmentary front elevational view, partly in section, of a portion of the washer adjacent one end of the drum.

Figure 8:
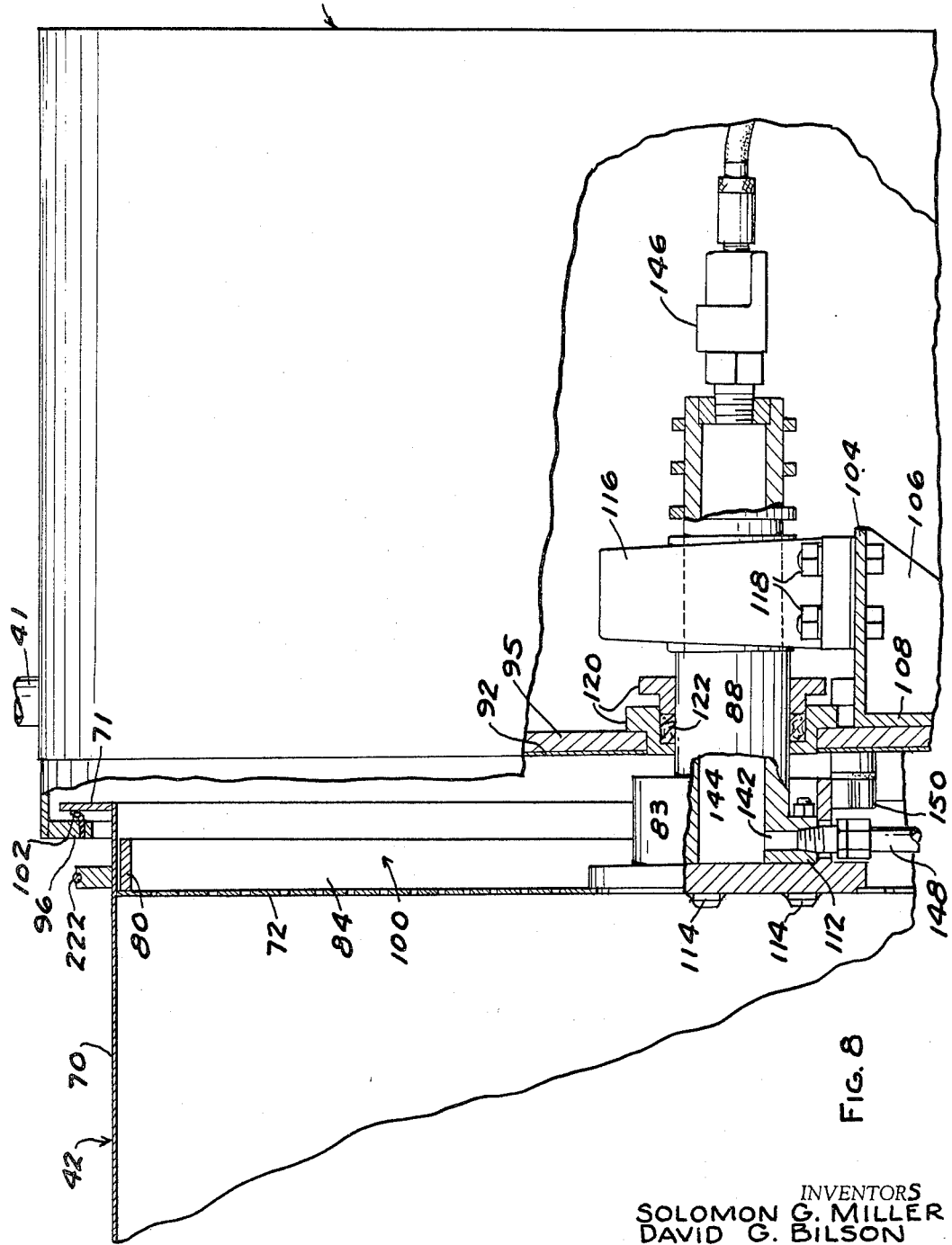

FIG. 8, a fragmentary front elevational view, partly in section, of a portion of the washer adjacent the end of the drum opposite that shown in FIG. 7.

Figure 9:
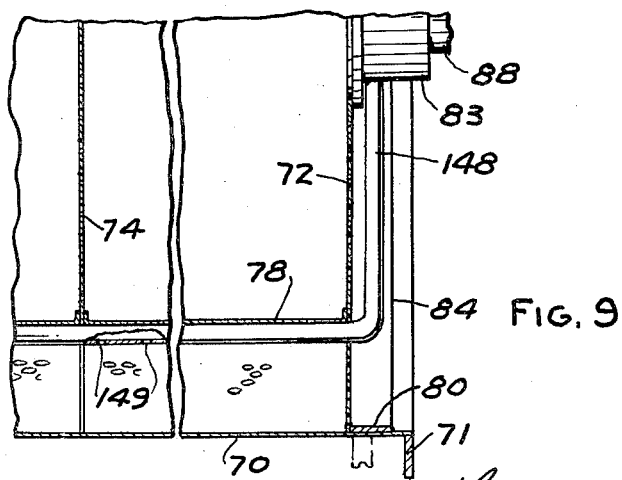

FIG. 9, a sectional view on line 9—9 of FIG. 6.

Figure 10:
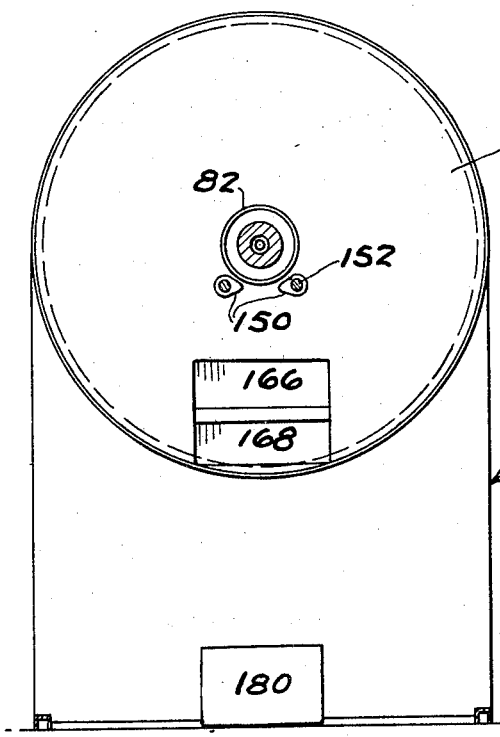

FIG. 10, a vertical section through the drum hub showing the lifter cams and a rinse and drain passageway.

Figure 11:
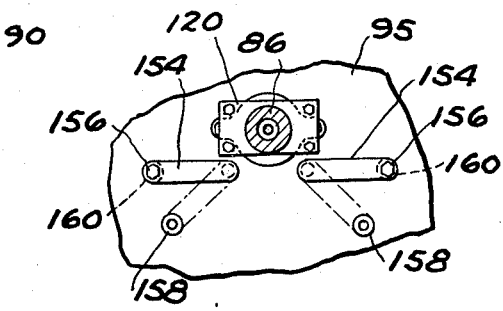

FIG. 11, a vertical section through the stub shaft at one end of the drum showing the cam operating levers.

Figure 12:
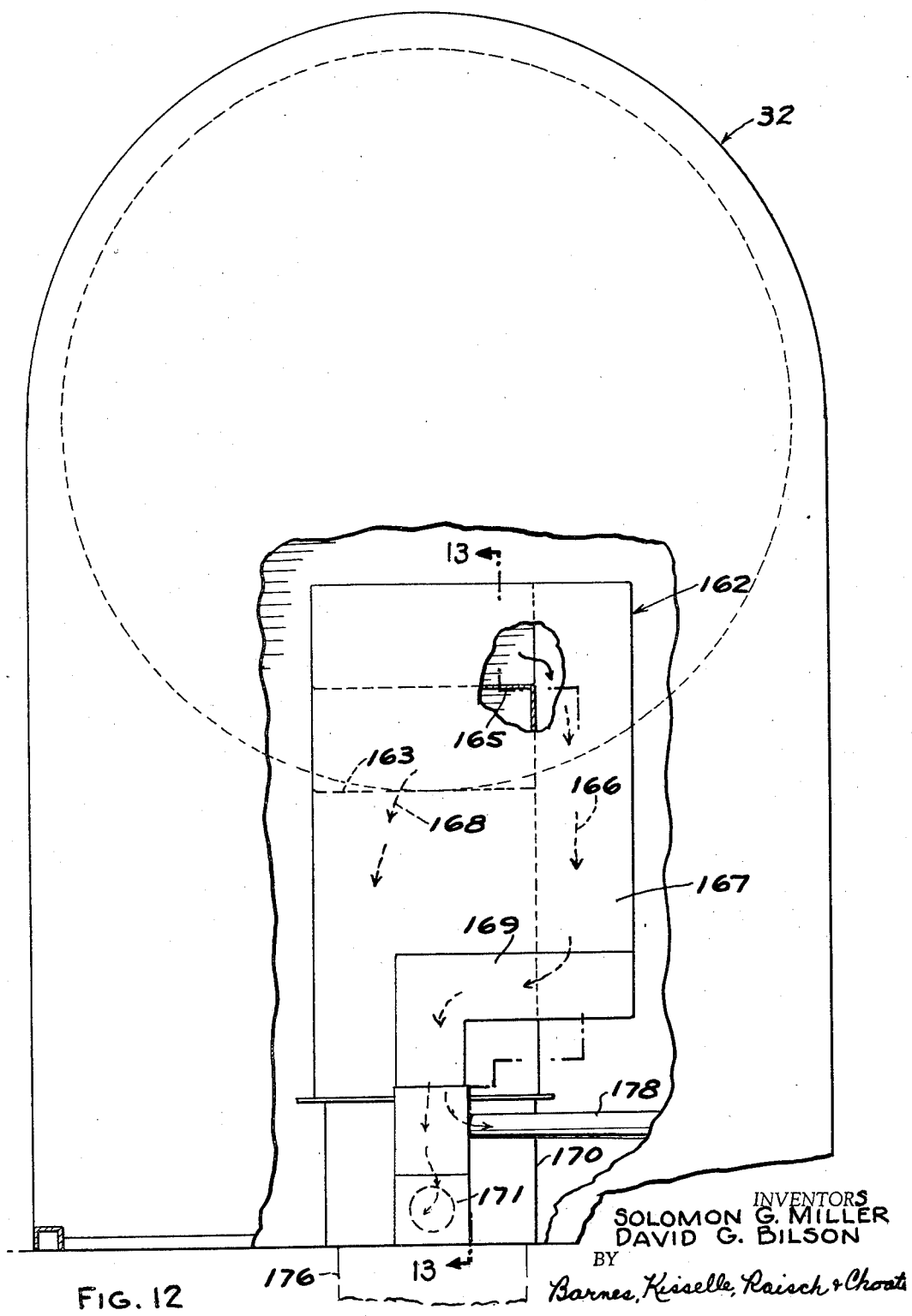

FIG. 12, an end view of the washer with sections broken away showing the rinse and drain ductwork at one end of the drum.

Figure 13:
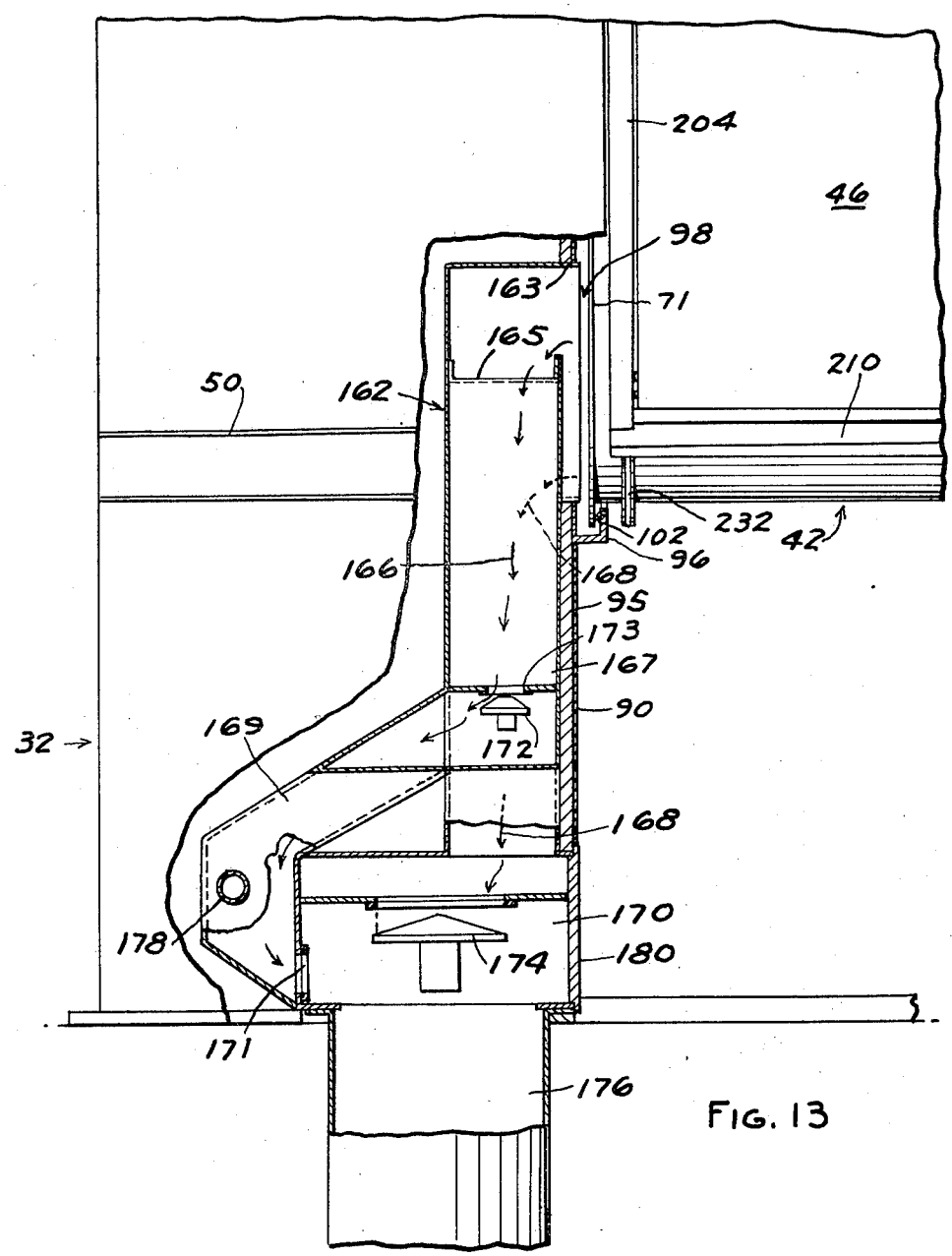

FIG. 13, a fragmentary front elevational view of the washer with a sectional view of the ductwork on line 13—13 of FIG. 12.

FIG. 14, an end view with a section broken away showing the ductwork at the end of the drum opposite that shown in FIG. 13.

Figure 15:
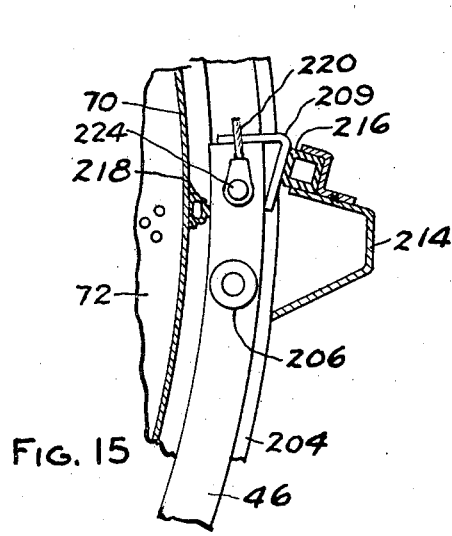

FIG. 15, a vertical section through the upper door bracket showing the door in the fully closed and locked position.

Figure 16:
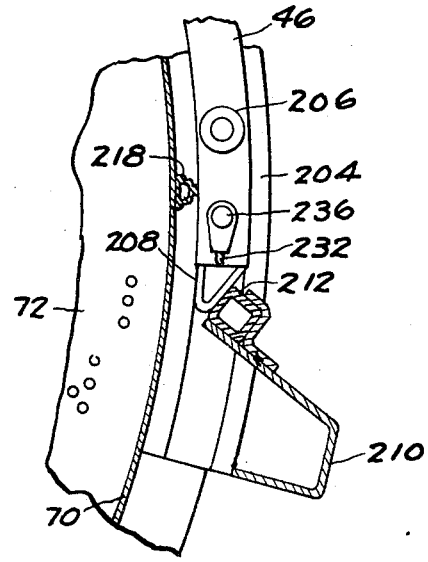

FIG. 16, a vertical section through the lower door bracket showing the door in the fully closed and locked position.

FIG. 17, a sectional view on line 17—17 of FIG. 4.

Figure 18:
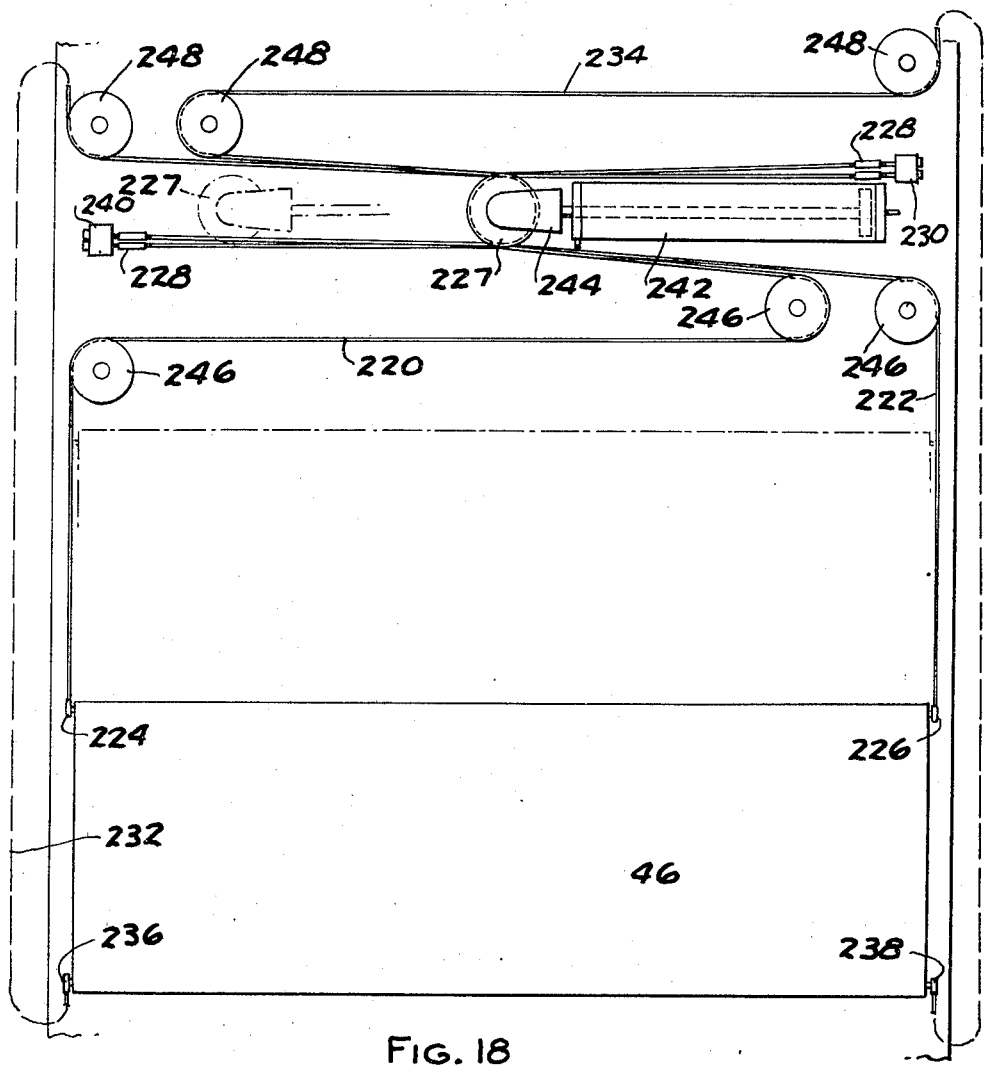

FIG. 18, a schematic view of the door and its operating mechanism.

Figure 19:
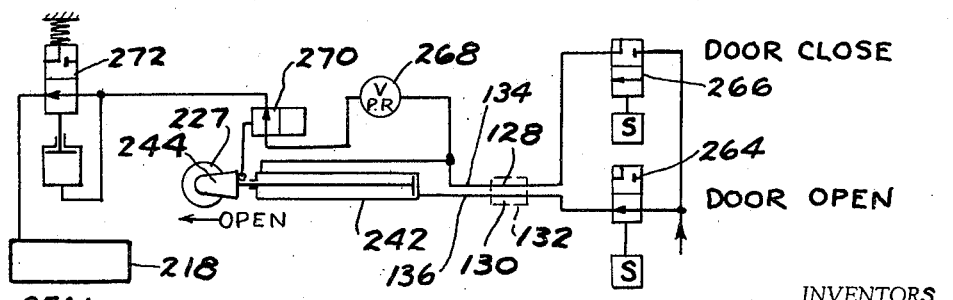

FIG. 19, a schematic diagram of the pneumatic control system for the door mechanism and inflatable seal.

In brief, the disclosed structure is a shell-less washer in which a drum for receiving clothes to be washed is journaled at its ends on a base for rotation about its longitudinal axis. The ends of the drum are perforated so that liquids can pass into and can be removed from the drum through its ends. A chamber in each base unit circumscribes the ends of the drum and a liquid seal is provided between the peripheral edges of the chamber and drum. Liquid inlet and outlet ducts are connected to the chambers so that a large volume of liquid can be rapidly injected into or removed from the drum. The drum is formed with an access opening running substantially its entire length so that articles to be washed can be readily placed in and removed from the drum. A one-piece door circumferentially overlies a portion of the drum and is mounted on curved tracks so that it can be moved around the drum to overlie the opening through which articles are inserted and removed. Bumpers on the door and track cooperate to cam the door radially inwardly in the closed position. An inflatable seal is attached to the drum adjacent the periphery of the opening so that it is interposed between the drum and the door when the door overlies the opening. Inflation of the seal causes it to expand and contact the door, thereby sealing the gap or space between the drum and the door and also urging the door radially outward into firm engagement with the door bumpers. The door is operated by an air cylinder through an arrangement of pulleys and cables. For easy service and maintenance, the drum is suppported for rotation by two stub shafts which are removably connected to collars attached to the ends of the drum. Cams pivotally connected to the bases adjacent the collars are movable to engage the collars and support the drum while the stub shafts are disconnected from the drum for service and maintenance.

Referring to the drawings:

In FIG. 1, a shell-less automatic washing machine, designated generally as 30, with pedestal bases 32, 34, a safety gate 36, a control panel 38, water inlets 40, 41, and a rotatable laundry drum 42 with an access opening 44 and a door 46 is shown. As shown in FIG. 3, drum 42 can be positioned so that opening 44 is at the top of washer 30 for top loading of soiled articles and it can be positioned with opening 44 at the bottom of washer 30 so that clean articles will drop out of the washer when door 46 is opened. Drum 42 can also be positioned so that opening 44 is on the side of washer 30 so that articles can be manually loaded and unloaded from the washer when door 46 is open.

As shown in FIGS. 1 and 2, channel members 48, 50 are in opposed spaced apart relationship to each other and are connected to base pedestals 32, 34 at 52. Another channel (not illustrated) interconnects base pedestals 32, 34 at the rear side thereof. Safety gate 36 is a plurality of metal straps 54 which are laterally spaced between and pivotally connected to channel members 48, 50 by pins 56 and spacers 58. Two channel sections 60 are pivotally connected to the opposed ends of straps 54 by pins 62. An air cylinder 64 pivotally connected at 66 to pedestal base 32 and to a metal strap 54 of safety gate 36 at 68 actuates and controls the rotational movement of straps 54 about pivots 56 so that in one position the straps present a barrier extending across the front of drum 42 and in the other position they are concealed behind channel 50 to provide free access to drum 42.

As shown in FIGS. 4, 5 and 6, drum 42 is formed as a hollow sheet metal cylinder 70 with end flanges 71, opening 44 in its side, perforated sheet metal end walls 72 and perforated partitions 74 which divide the drum into four compartments. End walls 72 and partitions 74 are perforated so that liquids can flow through both the ends of drum 42 and through each compartment as hereafter explained in detail. Two longitudinally extending generally U-shaped baffles 76 and two generally V-shaped longitudinally extending baffles 78 are attached in spaced apart relationship to the interior of cylinder 70 to assure tumbling action of the articles when drum 42 is rotated. Both sets of these baffles are perforated. Baffles 76 are located generally opposite to the location of opening 44. The sidewalls of baffles 76 extend generally radially of cylinder 70 and thus provide excellent agitation to the clothes when the drum is rotated. Baffles 78 are formed with sidewalls 77 which, when the drum is in the bottom unload position referred to in FIG. 3, extend vertically downwardly to the opposite edges of opening 44. Sidewalls 79 of baffles 78 are inclined so that when the drum is in the bottom unload position they form ramps which slope downwardly toward opening 44 at an angle only sufficient to assure discharge of the load. The disposition of sidewalls 77, 79 prevents the load from "hanging up" on the baffles when the drum is in the unload position but at the same time these sidewalls are inclined sufficiently to assure agitation of the load when the drum is rotated.

As shown in FIG. 5, an octagonal-shaped reinforcing ring 80 is connected to cylinder 70. Centrally located hubs 82, 83 are connected to octagonal ring 80 and hence cylinder 70 by struts 84. Stub shafts 86, 88 are connected to hubs 82, 83 as hereinafter described to provide journals for rotation of drum 42.

As shown in FIGS. 7 and 8, sheet metal exterior end walls 90, 92 on bases 32, 34 and circular generally L-shaped flanges 94, 96 connected to the exterior side of walls 90, 92 cooperate with end walls 72 of drum 42 to form liquid control chambers 98, 100 for injecting liquids into and removing them from drum 42 as explained in detail hereafter. End walls 90, 92 are reinforced by steel plates 95. Seals 102 on flanges 94, 96 engage drum flanges 71 to provide a watertight connection between rotatable drum 42 and liquid control chambers 98, 100. End walls 90, 92 and the portions of drum 42 that are in contact with water and liquid detergents are formed from stainless steel to retard corrosion.

Bearing support plates 104 and gussets 106 are welded at 108 to steel plates 95. Stub shafts 86, 88 each with an end flange 110, 112 are centered in and connected to hubs 82, 83 by suitable bolts and nuts 114 and are journaled by bearings 115 on pillow blocks 116 which are connected to support plates 104 by suitable bolts and nuts 118. Packing rings 120 with a suitable sealing material 122 provides a watertight seal between rotatable shafts 86, 88 and liquid control chambers 98, 100. Passageways 124, 126 in hub 82 (FIG. 7) and passageway 128 and tube 130 in stub shaft 86 cooperate to provide air line connections between swivel coupling 132 and air lines 134, 136 for the actuation of door 46 as explained in detail hereafter. A pulley 138 connected to stub shaft 86 and belt 140 connected to a pulley on an electric motor (not shown) in pedestal base 32 imparts rotary motion to drum 42. Passageway 142 in flange 112 (FIG. 8) and passageway 144 in stub shaft 88 cooperate with swivel coupling 146 to supply a liquid detergent to liquid line 148 on barrel 42. As shown in FIGS. 6 and 9, detergent line 148 extends the full length of drum 42 and has a plurality of holes 149 through which a liquid detergent can be injected into drum 42. Line 148 lies within one of baffles 78.

For the purpose of servicing the journals at the opposite ends of drum 42 means are provided for supporting the drum independently of pillow blocks 116. These means are illustrated in FIGS. 7, 8, 10 and 11 and include two pairs of cams 150 pivotally supported on walls 95 at opposite ends of the drum so as to underlie hubs 82, 83. Each cam 150 is fixed to one end of a rotatable pin 152 extending through wall 95. An arm 154 is fixed to the opposite end of each pin 152. The free end of each arm 154 is apertured so that the arm can be selectively locked by a screw 156 with threaded bushings 158 and 160 welded to walls 95 on the side thereof opposite cams 150. When arms 154 are locked in the broken line position illustrated in FIG. 11, drum 42 is supported at hubs 82, 83 by cams 150. When the drum is supported by cams 150, the entire journal and seal assemblies at opposite end of the drum can be removed for servicing.

The drain arrangement at the driven end of the drum comprises the ductwork 162 illustrated in FIGS. 12 and 13. At its upper end, ductwork 162 communicates with liquid chamber 98 through an opening 163 in the adjacent end wall 95. Ductwork 162 generally defines two passageways 166, 168. Passageway 166 extends from the upper portion of opening 163 laterally over a horizontal baffle 165, downwardly through a chute 167, then through a bend 169 and an opening 171 to a dump box 170. An opening 173 in a plate in chute 167 is controlled by a solenoid operated valve 172. Passageway 168 extends straight downwardly from the lower portion of opening 163 below baffle 165 and to the upper portion of dump box 170. A solenoid controlled dump valve 174 in dump box 170 controls the discharge from passageway 168 to a floor drain 176. A rinse water bypass conduit 178 connects with bend 169 of passageway 166, and if it is desired excess rinse water can be stored and reused by covering opening 171 and connecting conduit 178 to a storage container (not shown). If no storage facilities are desired, conduit 178 is capped and the excess rinse water is discharged into drain 176 through opening 171. At the side thereof opposite opening 171 dump box 170 is provided with a removable cover 180 to enable ready access to valves 172, 174 for servicing.

At the opposite end of the machine, a ductwork 196 directs liquid from liquid chamber 100 down to a dump box 182. A dump valve similar to valve 174 in box 182 controls the discharge of liquid to a floor drain 184.

When it is desired to drain drum 42, both dump valves 174 are opened and the liquid in the drum is discharged directly to the floor drain from both ends of the drum. When the machine is operating on the rinse cycle, clear hot water is directed into drum 42 through water inlet 41 and valve 172 is opened. The water in the drum at a level above baffle 165 flows downwardly through passageway 166 and either into drain 176 through opening 171 and dump box 170 or if opening 171 is covered through conduit 178 to a storage tank for subsequent use.

Curved sections of door track 204 (FIG. 4) are attached to drum 42 between the ends of opening 44 and flanges 71. Two rollers 206 are connected to each end of curved door 46 and engage in tracks 204 so that the curved door can move in track 204 around a portion of the periphery of drum 42. Tracks 204 are long enough to allow door 46 to clear or uncover the entire opening 44. Rollers 206 are slightly smaller in diameter than the height of track 204 so that door 46 can also move slightly radially outward from drum 42. As shown in FIGS. 15 and 16, a generally V-shaped bumper plate 208 is attached to the lower edge of door 46 and extends the entire length of the door, and a generally L-shaped bumper plate 209 is attached to the upper edge of door 46 and extends the entire length of the door. A bracket 210 with a rubber bumper 212 is attached to and extends longitudinally between tracks 204 and is positioned so that rubber bumper 212 engages with bumper plate 208 when door 46 completely overlies opening 44. A second bracket 214 is attached to and extends between tracks 204 and is positioned so that rubber bumper 216 overlies and engages bumper plate 209 when door 46 completely overlies opening 44. In the fully closed position door 46 is cammed radially inwardly by bumpers 212 and 216.

As shown in FIGS. 4 and 17, an inflatable seal 218 is attached to shell 70 about the periphery of opening 44 so that it will be interposed between shell 70 and the underside of door 46 when the door overlies opening 44. When seal 218 is inflated, it contacts the undersurface of door 46 thereby providing a water-tight seal between door 46 and the interior of drum 42. Inflation of seal 218 also tends to urge door 46 radially outward from drum 42 to thereby urge bumper plates 208, 209 into firm contact with rubber bumpers 212, 216. The mating or engaging surface of bumper bracket 208 and rubber bumper 212 and the mating surface of bumper bracket 209 and rubber bumper 216 are inclined with respect to each other and with respect to drum 42 as shown in FIGS. 15 and 16 to cam door 46 radially inwardly when it covers opening 44. Deflation of seal 218 (as shown in the dotted outline in FIG. 17) provides a gap between the seal and door 46 so that the door can be moved without interfering with the deflated seal.

As shown in FIGS. 4, 5 and 18, a first set of two cables 220, 222 is connected at one end to the upper left and right-hand corners of door 46 at 224, 226. These cables extend in the same general direction around a portion of drum 42 and engage within two grooves of a four-groove actuator pulley 227. At their opposite ends, cables 220, 222 are connected by turnbuckles 228 to an anchor block 230 fixedly mounted on drum 42. A second set of two cables 232, 234 is connected at the lower left and right-hand corners of door 46 at 236, 238. These cables extend around drum 42 in a direction opposite to that of the first set of cables and engage within the other two grooves of pulley 227. At their opposite ends, cables 232, 234 are connected by turnbuckles 228 to an anchor block 240 fixedly mounted on drum 42. An air cylinder 242 is mounted on drum 42 and its piston rod is connected by a yoke 244 to four-groove pulley 227 to provide a reciprocal motion for pulley 227. Idler pulleys 246 are positioned on drum 42 so that each of the first set of cables forms a generally U-shaped configuration opening to the right (as shown in FIG. 18) and centered about the path of motion of pulley 227. Idler pulleys 248 are positioned so that each of the second set of cables forms a generally U-shaped configuration opening in the opposite direction or to the left (as shown in FIG. 18) and centered about the path of motion of pulley 227. Movement of pulley 227 to the left causes door 46 to move upward (as shown in FIG. 18) or to move counterclockwise (as shown in FIG. 5) about drum 42, thereby uncovering opening 44. Movement of pulley 227 to the right causes door 46 to move downward or counterclockwise thereby covering or closing opening 44.

A schematic diagram for the control and supply of air to door seal 218 and door position cylinder 242 through swivel coupling 132 and air lines 134, 136 on drum 42 is shown in FIG. 19. The inlet ports of solenoid operated valves 264, 266 are connected to a source of compressed air (not shown) and the outlet port of valve 264 is connected to the head end of cylinder 242 through swivel coupling 132 and conduit 136. The outlet port of valve 266 is connected through swivel coupling 132 and conduit 134 to both the rod end of cylinder 242 and the inlet of pressure regulator 268. The outlet of regulator 268 is connected to the inlet port of pilot valve 270 which is mechanically actuated by cylinder 242 when it is in its fully retracted position. The outlet port of pilot valve 270 is connected to an inlet of a quick dump valve 272 which closes on a rise in pressure and opens on a drop in pressure. The outlet port of dump valve 272 is connected to door seal 218. Valves 264, 266 and 272 are normally exhausted to the atmosphere.

MODE OF OPERATION OF WASHER

Solenoid valve 264 is energized causing air to flow through swivel coupling 132, conduit 136, and into cylinder 242 forcing it to the fully extended position. The movement of the piston in cylinder 242 to the left (as shown in FIG. 18) imparts motion to cables 220, 222, 232, 234 causing door 46 to move counterclockwise (as shown in FIG. 5) around drum 42 thereby uncovering opening 44. The articles to be washed are placed through opening 44 into the various compartments of drum 42. Solenoid valve 264 is deenergized and solenoid valve 266 is energized causing air to flow through coupling 132 and conduit 134 into the opposite end of cylinder 242 thereby moving it to the right (as shown in FIG. 18) which moves door 46 clockwise (as shown in FIG. 5) around drum 42 so that it covers or is positioned over opening 44. When cylinder 242 moves all the way to the right, yoke 244 strikes the lever arm of pilot valve 270 thereby causing air to flow through valve 270 to dump valve 272 and thence to seal 218. Inflation of seal 218 provides a water-tight seal between the interior of drum 42 and door 46 and urges the door into firm contact with bumpers 212, 216. At this time valves 172, 174 are closed so that a liquid cannot flow from ducts 162, 196 into drains 176, 184. Wash water is then injected into drum 42 from both ends through water inlets 40, 41, fixed chambers 98, 100 and perforated end walls 72; and a detergent is injected into drum 42 through swivel coupling 146, stub shaft passageway 144 and detergent line 148. Drum 42 is then rotated to agitate or tumble the articles in the wash water until they are adequately washed.

After the articles are adequately washed, dump valves 174 are opened so that the dirty wash water is drained from both ends of drum 42 through duct 196 and passageway 168 of duct 162. After all of the dirty wash water is drained from drum 42, the dump valves are closed and rinse water is injected into one end of drum 42 through water inlet 41, fixed control chamber 100 and perforated end 72 of drum 42. This provides a cross flow of rinse water through drum 42 which hastens the rinsing of the washed articles. Valve 172 is opened and the excess rinse water which flows into duct 166 can either be pumped into a storage tank (not shown) through pipe 178 if opening 171 is covered so that it can be used in a subsequent cycle as wash water or it can be discharged through opening 171 into floor drain 176. After the washed articles are completely rinsed, the flow of water through inlet 41 is discontinued and the dump valves are opened so that the rinse water will be drained from both ends of drum 42 to drains 176, 184. After rotation of drum 42 is stopped with door 46 positioned in either the side or bottom unload position (as shown in FIG. 3), solenoid valve 266 is de-energized and valve 264 is energized to open door 46 so that the washed articles can be unloaded from the washer. The deenergizing of solenoid valve 266 causes a pressure drop in the line to valve 272 and valve 272 immediately exhausts seal 218 to the atmosphere so that it is collapsed before cylinder 242 and its related cables begin to move door 46. It will be appreciated that suitable controls are provided for cycling the machine automatically when desired.

It should be noted that by using fixed liquid control chambers 98, 100 and perforated end walls 72 and dividers 74 in drum 42, it is possible to inject and remove large amounts of liquid from the washer in a relatively short period of time. The cables, pulleys, door track and actuating cylinder provide a relatively simple and compact structure for automatically opening and closing door 46. The use of a single door to seal all of the compartments in drum 42 provides an economical structure for sealing the various compartments of the drum and also simplifies the mechanism which is required to uncover and close opening 44. The disconnectable stub shafts 86, 88 and cams which can be positioned to support drum 42 when the shafts are removed materially assists in the service and maintenance of the shell-less washer. The provision of perforated baffles 76, 78 not only assures agitation of the load without restricting free discharge thereof but also provide a more direct path for discharge of dirty water from both ends of the drum without passing through all the washed articles.

What we claim is:

1. In a shell-less washer of the type having a rotatable drum and a fixed support, the improvement which includes:
  (a) a hollow drum with an opening through which articles can be inserted and removed from said drum,
  (b) a door movably mounted on said drum so that said door can be moved circumferentially about the surface of said drum to positions adjacent to and covering said opening, said door being shaped so that its terminal edges extend beyond said opening when said door is in said covering position,
  (c) bumper plate means adjacent the longitudinal edges of said door and connected to said door,
  (d) bumper means connected to said drum and positioned to radially overlie and engage with said bumper plate means when said door completely covers said opening, and
  (e) expandable sealing means circumscribing said opening and interposed between said drum and said door when said door completely covers said opening,
whereby expansion of said sealing means provides a watertight seal between the interior of said drum and said door and urges said bumper plate means into firm contact with said bumper means.

2. The improvement in a shell-less washer as defined in claim 1 in which said bumper plate means and said bumper means extend at least substantially the length of said opening.

3. The improvement in a shell-less washer as defined in claim 1 in which said expandable sealing means is an inflatable seal.

4. The improvement in a shell-less washer as defined in claim 1 in which said bumper plate means and said bumper means are so arranged that said door is urged generally radially inward toward said drum when said door completely overlies said opening.

5. The improvement in a shell-less washer as defined in claim 4 including circumferentially extending track means on said drum in which said door is mounted for movement, said track means permitting limited generally radial movement of said door with respect to said drum.

6. The combination called for in claim 1 wherein the drum is supported on a fixed support for rotation on its longitudinal axis and includes fluid actuated means on the drum for moving said door to and from said position closing said opening and for expanding said sealing means, conduit means on said drum and said fixed support for supplying fluid to said fluid actuating means from a fluid pressure source, said conduit means including a swivel conduit coupling at the axis of rotation of said drum for interconnecting the conduit means on the drum with the conduit means on the fixed support.

7. The combination called for in claim 6 wherein said fluid actuated means includes an air cylinder having a reciprocating ram and cable means operatively connected between said ram and the opposite longitudinal sides of said door for shifting the door circumferentially in opposite directions to and from said position closing said opening.

8. The combination called for in claim 6 wherein said fluid actuating means includes an air cylinder having a reciprocating ram, said ram being provided with a pulley at the free end thereof, a first pair of cables anchored at one end on said drum, extending around said pulley and having their opposite ends connected one to each end of the door adjacent one longitudinal side thereof and a second pair of cables anchored at one end on said drum, extending around said pulley and having the opposite ends thereof connected one to each end of the door adjacent the opposite longitudinal side thereof.

9. In a shell-less washer of the type having a rotatable drum and a fixed support, the improvement which includes:
  (a) a hollow drum with a peripheral opening through which articles can be inserted and removed from said drum,
  (b) door track means mounted on said drum so that a door connected to said track means can be moved circumferentially about the outer peripheral surface of said drum from a position adjacent to said peripheral opening to a position overlying said opening,
  (c) a door cooperatively connected to said track means, said door being shaped so that its terminal edges extend beyond the periphery of said opening when said door is positioned in said track means to overlie said opening,
  (d) bumper plate means adjacent the longitudinal edges of said door and connected to said door,
  (e) bumper means connected to said drum and positioned to radially overlie and engage with said bumper plate means when said door completely overlies said opening, and
  (f) expandable sealing means circumscribing the periphery of said opening and interposed between said drum and said door when said door completely overlies said opening,
whereby expansion of said sealing means provides a watertight seal between the interior of said drum and said door and urges said bumper plate means into firm contact with said bumper means.

10. In a shell-less washer of the type having a rotatable drum and a fixed support, the improvement which includes:
  (a) a hollow drum with an opening through which articles can be inserted and removed from said drum, (b) a door movably mounted on said drum so that said door can be moved about the peripheral surface of said drum to positions adjacent to and covering said opening, (c) means providing a reciprocal motion, said means being mounted on said drum, and (d) means connecting said reciprocal motion means to said door so that movement in one direction of said reciprocal motion means moves said door to a position covering said opening and movement of said reciprocal motion means in its other direction moves said door to a position uncovering said opening.

11. The improvement in a shell-less washer as defined in claim 10 in which said connecting means includes pulley means connected to said reciprocal motion means and at least one cable fixedly connected to said door and engaging said pulley means.

12. The improvement in a shell-less washer as defined in claim 10 in which said reciprocating motion means includes a fluid actuating ram.

13. The improvement in a shell-less washer as defined in claim 10 including:

(a) means supporting said drum at its opposite ends for rotation about its longitudinal axis on said support, said reciprocating motion means comprising a fluid motor, (b) a swivel fluid coupling at one end of the drum at its axis of rotation, said coupling being adapted to be connected to a source of pressure fluid and a conduit, and (c) means on said drum extending from said fluid motor to said fluid coupling for supplying a fluid under pressure to said fluid motor.

14. In a shell-less washer of the type having a rotatable drum and a fixed support, the improvement which includes:

(a) a hollow drum with an opening through which articles can be inserted and removed from said drum, (b) a door mounted on said drum for movement circumferentially thereof to positions uncovering and covering said opening, (c) reciprocating power means fixedly mounted on said drum, said power means including an actuator pulley means, (d) a first set of cables in spaced apart relationship with one end of each cable connected to an upper portion of said door, each of said cables of said first set extending generally circumferentially about a portion of said drum in one direction and extending around said actuator pulley means in the same general direction, each of said cables being fixedly connected at their other ends to a lower portion of said door, and (e) a second set of cables in spaced apart relationship with one end of each cable connected to an upper portion of said door, each of said cables of said second set extending generally circumferentially about a portion of said door in a direction generally opposed to said first set and around said actuator pulley means in a generally opposite direction to said first set of cables, each of said cables being fixedly connected at their other ends to said drum, so that movement of said actuator pulley means by said reciprocating power means in one direction foreshortens the effective length of said first set of cables and extends the effective length of said second set of cables thereby uncovering said opening and movement of said actuator pulley means in the opposite direction foreshortens the effective length of said second set of cables and extends the effective length of said first set of cables thereby covering said opening.

References Cited

UNITED STATES PATENTS

| | | | |
|---|---|---|---|
| 1,924,521 | 8/1933 | Smith | 68—139 |
| 2,960,778 | 11/1960 | Cowlin | 68—139 X |
| 3,071,184 | 1/1963 | Peel | 68—139 X |
| 3,240,038 | 3/1966 | Schwegler | 68—139 X |
| 3,240,382 | 3/1966 | Files | 68—139 X |

WILLIAM I. PRICE, Primary Examiner

U.S. Cl. X.R.

68—145, 210